(No Model.)
J. H. DAY.
MACHINE FOR SPREADING VISCOUS SUBSTANCES.
No. 410,822. Patented Sept. 10, 1889.
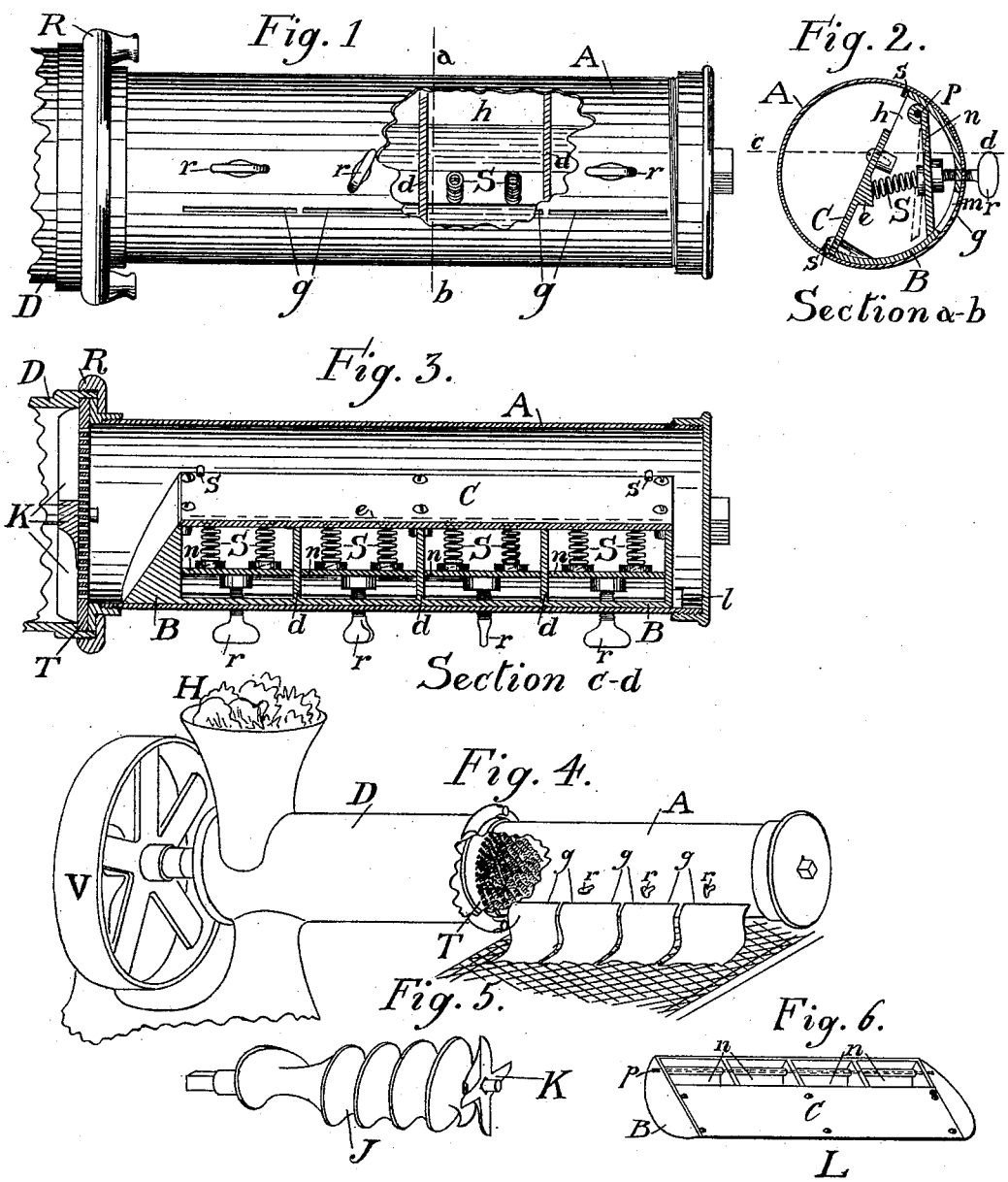
Witnesses:
Walter E. Ward.
Grace T. Many
Inventor
John H. Day.
per Frederick W. Cameron.
Attorney

UNITED STATES PATENT OFFICE.

JOHN H. DAY, OF ALBANY, NEW YORK.

MACHINE FOR SPREADING VISCOUS SUBSTANCES.

SPECIFICATION forming part of Letters Patent No. 410,822, dated September 10, 1889.

Application filed July 12, 1889. Serial No. 317,323. (No model.)

*To all whom it may concern:*

Be it known that I, JOHN H. DAY, a citizen of the United States, residing at the city of Albany, in the county of Albany and State of New York, have invented a new and useful Machine for Spreading Viscous Substances, of which the following is a specification.

My invention relates to machines for spreading substances of a sticky gluey nature, or of a semi-liquid consistency, for drying; and the object of my invention is to produce a machine for spreading in thin layers or ribbons the substances to be dried, in order that the moisture contained therein may be more readily expelled. I attain this object by the mechanism illustrated in the accompanying drawings, in which—

Figure 1 is an elevation with a part of the cylinder broken away. Fig. 2 is a vertical section along the line $a\,b$ on Fig. 1. Fig. 3 is a horizontal section along the line $c\,d$ of Fig. 2. Fig. 4 is an elevation showing my improved spreader in operation. Fig. 5 shows the propeller J and knife K of the feeding mechanism, and Fig. 6 is a detail view of the valve-holding receptacle.

Similar letters refer to similar parts throughout the several views.

For the purpose of drying many substances, especially those of a viscous nature—such as paste, glue, and many chemical compounds—it is desirable to cause them to assume a thin ribbon-like form, in order that the water may be rapidly expelled by evaporation or by other means. To accomplish this result, the substance to be treated is placed into the hopper H, (see Fig. 4,) and coming into contact with the propelling-screw J, attached to the power-pulley V, it is moved forward by the action of the screw and comes in contact with the rotating knife K, attached to the screw J near its point, where it is cut into small particles capable of being forced through the perforated plate T, placed at the end of the cylinder D near the knife K.

The mechanism thus described is substantially the same as that in use for making mince-meat.

To the end of the cylinder D of the feeding and cutting machine I attach by suitable coupling R, Fig. 3, the cylinder A, which is open at the end nearest the perforated plate T and closed by a suitable cap at the opposite end. The coupling referred to is made by screwing the ring R on the cylinder A onto the cylinder D, there being threads cut on the cylinder D near the end to which the cylinder A is to be attached.

Along the lower side of the cylinder A, I cut a series of slots $g\,g\,g$, through which the thin layers of paste or other treated substances pass.

In order that the substances may pass in uniform thickness through the slots $g$ and be readily and uniformly delivered in layers preparatory to drying, I arrange a system of valves within the cylinder A in the following manner: I place within the cylinder the valve-containing receptacle L, which fits closely against one-half of the interior surface of the cylinder, being semicircular in form. The plate C, which forms the back of the receptacle L, passing through the cylinder at or near the center thereof, is provided near one end (the top) with a longitudinal opening $h$, through which the substance passes from the cylinder into the receptacle L. To the upper interior portion of the semicircular side of the receptacle L, I attach by pin and eye or in any suitable manner the valves $n\,n\,n$, which are simply longitudinal narrow plates hinged on the pin or bolt P. Against the side of each of the valves $n$ toward the back plate C of the receptacle L presses the spiral spring S, which spring is secured to the plate C and to each valve $n$. The other side of the valve $n$ is operated upon by the thumb-screw $r$, passing through the cylinder A and the semicircular surface of the receptacle L and presses against a boss on the surface of the valve $n$. The resiliency of the spring S tends to close the valve and prevent the substance from passing out of the cylinder A.

The substance entering the cylinder A is forced through the opening $h$ in the receptacle L and passes through the slots $m$ and $g$ in layers of a thickness regulated by the valve $n$.

It is apparent that a greater or less number of valves may be used, as desired.

My machine is commonly used for drying flour paste, which ordinarily is composed of flour, glue, and water. After passing from my machine the paste is in a thin narrow ribbon-like form, from which the water may be rapidly expelled by evaporation.

What I claim as my invention, and desire to secure by Letters Patent, is—

1. In a spreading-machine, the combination of a cylindrical vessel having a longitudinal slot along its side, a valve-holding receptacle placed within said cylinder, a valve hinged at one side to a bolt in the interior of said valve-holding receptacle and having a spring pressing against one side thereof, and a thumb-screw passing through said cylinder in contact with the opposite side of said valve, substantially as described.

2. In a spreading-machine, the combination of a valve-holding receptacle L, placed within a cylinder A, provided with a valve $n$, operated by a spring S, pressing against the back plate C of the valve-holding receptacle and against one side of said valve $n$, the opposite side of said valve $n$ being in contact with a thumb-screw $r$, a longitudinal slot along the side of said valve-holding receptacle, and a corresponding slot $g$ in said cylinder, all substantially as described.

3. In a spreading-machine, the combination of the cylinder D, provided with a feeding-hopper H, a propeller J, placed longitudinally in said cylinder, a knife K, attached to the said propeller near its point, and the perforated plate T at the end of said cylinder near the knife K, with the cylinder A, attached to said cylinder D by coupling R, said cylinder A having a series of longitudinal slots $g$ along its side, and having a valve-holding receptacle L placed within it, containing a valve $n$, spring S, attached to the back plate C of the valve-holding receptacle and to the valve $n$, and a screw $r$, passing through the said cylinder and in contact with said valve $n$, all substantially as described.

JOHN H. DAY.

Witnesses:
  FREDERICK W. CAMERON,
  WALTER E. WARD.